United States Patent [19]

Pelosi, Jr. et al.

[11] 3,906,010

[45] Sept. 16, 1975

[54] SERIES OF 5-ARYL-2-FURAMIDINES

[75] Inventors: Stanford S. Pelosi, Jr.; Ronald E. White; Ralph L. White, Jr.; George C. Wright; Chia-Nien You, all of Norwich, N.Y.

[73] Assignee: Morton-Norwich Products, Inc., Norwich, N.Y.

[22] Filed: June 17, 1974

[21] Appl. No.: 479,830

[52] U.S. Cl. .... 260/347.5; 260/251 R; 260/256.4 R; 260/346.1 R; 260/347.7; 260/347.8; 424/251; 424/285
[51] Int. Cl. ............................................... C07d 5/16

[58] Field of Search ........................ 260/347.5, 347.7

[56] References Cited
UNITED STATES PATENTS
3,084,171  4/1963  Vonesch .......................... 260/347.7

*Primary Examiner*—Donald G. Daus
*Assistant Examiner*—Mark L. Berch
*Attorney, Agent, or Firm*—Anthony J. Franze

[57] ABSTRACT

A series of 5-aryl-2-furamidines are useful as antidepressants.

28 Claims, No Drawings

SERIES OF 5-ARYL-2-FURAMIDINES

This invention is concerned with a series of 5-aryl-2-furamidines of the formula:

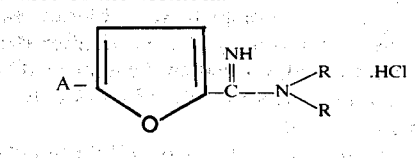

wherein A is 5-chloro-2-pyrimidinyl or

with X representing hydrogen, nitro, amino, halo, dihalo, 4-(lower)alkyl, 3-trifluoromethyl, 3,4-dimethoxy, 4-methyl-3-chloro, 4-alkoxy, 4-dimethylamino, 4-ethoxycarbonyl, 4-hydroxy, 4-methyl thio, 4-(1-hydroxy)ethyl, or 4-acetyl, and R represents hydrogen or ethyl. These compounds are useful as antidepressants. Their useful antidepressant activity is exhibited in warm blooded animals under the standard ptosis-anti-tetrabenazine test. Thus, when administered perorally in suspension (0.5 percent aqueous methyl cellulose) or aqueous solution in doses ranging from 50 to 200 mg/kg to mice shortly prior to intraperitoneal administration of from 1–10 mg/kg of tetrabenazine, ptosis induced by tetrabenazine is curtailed to the extent of from 50–100 percent.

The furamidines of this invention are prepared as illustrated in the following schema:

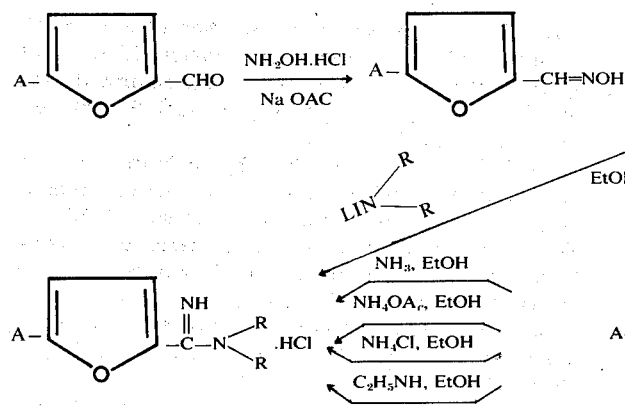
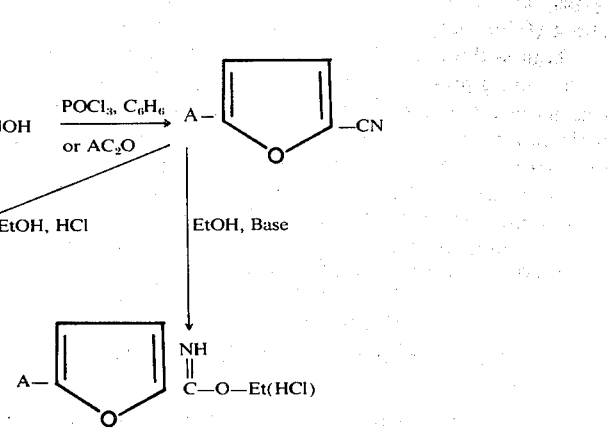

In the above schema, R and A have the significance previously ascribed.

The preparation of the amidines of this invention is more fully described in the following examples.

EXAMPLE I 5-(p-Nitrophenyl)-2-furamidine Hydrochloride

A stirred mixture of 106 g (0.50 mole) of 5-(p-nitrophenyl)-2-furonitrile, 90 ml (1.5 moles) of absolute ethanol, and 1500 ml of p-dioxane was treated intermittently with HCl gas over 4 hr at 10°–15°. After standing in a refrigerator overnight, additional HCl gas was added over 2 hr at 25°–30° and the mixture was cooled in ice. The solid was collected by filtration, washed with anhydrous ether, and dried in a vacuum oven at room temperature for 14 hr to give 136 g (92 percent) of ethyl 5-(p-nitrophenyl-2-furimidate hydrochloride, m.p. 217°–220°.

Anal. Calcd. for $C_{13}H_{12}N_2O_4 \cdot HCl$: C, 52.62; H, 4.42; N, 9.44. Found: C, 52.46; H, 4.31; N, 9.35.

Ethyl (5-p-nitrophenyl)-2-furimidate hydrochloride (60 g, 0.20 mole) was added in portions to a stirred solution of 6.0 g (0.30 mole) of ammonia in 1500 ml of anhydrous methanol. The mixture was heated under reflux for 5 hr and stored in a refrigerator overnight. The solid was collected by filtration to give 27 g. The filtrate was concentrated in a rotary evaporator, and the solid which was deposited was collected by filtration to give 17 g more of title compound, m.p. 300°.

Anal. Calcd. for $C_{11}H_9N_3O_3 \cdot HCl$: C, 49.36; H, 3.77; N, 15.70. Found: C, 49.43; H, 3.76; N, 15.72.

EXAMPLE II 5-(p-Aminophenyl)-2-furamidine Hydrochloride

A mixture of 4.0 g (0.015 mole) of the compound of Example I and 145 ml of absolute EtOH was shaken in the presence of 5 percent Pd/C ($H_2O$) (ca. 1 teaspoon) under $H_2$ pressure (40 psi) for 1¼ hr with the theoretical uptake of $H_2$. The mixture was warmed and was filtered to separate the catalyst. The yellow filtrate was diluted with 500 ml of anhydrous ether and was cooled overnight. The solid was collected by filtration to give 2.0 g (59 percent) of 5-(p-aminophenyl)-2-furamidine hydrochloride. Drying under reduced pressure at the temperature of refluxing water overnight gave an analytical sample, m.p. 253°–261° (dec).

Anal. Calcd. for $C_{11}H_{11}N_3O \cdot HCl$: C, 55.58; H, 5.09; N, 17.68. Found: C, 55.15; H, 5.19; N, 17.42.

EXAMPLE III 5-(p-Chlorophenyl)-2-furamidine Hydrochloride

A. 5-(p-Chlorophenyl)-2-furaldehyde Oxime

A mixture of 21 g (0.10 mole) of 5-(p-chlorophenyl)-2-furaldehyde, 14 g (0.20 mole) of hydroxylamine hydrochloride, 16.5 g (0.20 mole) of anhydrous sodium acetate, 350 ml of 95 percent ethanol, and 35 ml of water was heated under reflux for 3½ hr. After cooling, the mixture was poured into 1 l. of cold water. The solid which was deposited was collected by filtration and dried in 50° oven overnight to give 22 g (100 percent) of 5-p-chlorophenyl)-2-furaldehyde oxime. One recrystallization from an isopropanol-H$_2$O mixture gave an analytical sample, m.p. 139°–141°.

Anal. Calcd. for C$_{11}$H$_8$ClNO$_2$: C, 59.61; H, 3.64; N, 6.32. Found: C, 59.60; H, 3.57; N, 6.28.

B. 5-(p-Chlorophenyl)-2-furonitrile

A solution of 6.9 g (0.045 mole) of phosphorus oxychloride in 10 ml of benzene was added dropwise over 0.5 hr to a stirred refluxing solution of 20 g (0.09 mole) of A in 350 ml of benzene. The reaction mixture was heated under reflux for 2 hr, cooled and filtered. The filtrate was washed with 5% sodium bicarbonate solution, with water, and dried over MgSO$_4$. Solvent was removed on a rotary evaporator to give 16 g of residual solid. The solid was dissolved in hot MeOH, and water was added to turbidity. The black oily material which was deposited was separated by filtration and dicarded. The filtrate was cooled to give a tan solid which was collected by filtration and dried in a 60° oven; weight was 12 g (65 percent), m.p. 76°–77°.

Anal. Calcd. for C$_{11}$H$_6$ClNO: C, 64.88; H, 2.97; N, 6.88. Found: C, 64.73; H, 2.99; N, 6.91.

C. Ethyl 5-(p-Chlorophenyl)-2-furimidate Hydrochloride

A stirring solution of 150 g (0.74 mole) of B in 3000 ml of absolute ethanol was treated with hydrogen chloride gas for 1½ hr with a solid forming. This solid, after standing overnight, was filtered, washed on the funnel with ether and dried in a desiccator to yield 176 g (83 percent). An analytical sample was prepared by dissolving a sample in S.D.A. No. 32, treating with Darco, and adding hexane until a solid precipitated, m.p. 191°–192° (MelTemp).

Anal. Calcd. for C$_{13}$H$_{12}$ClNO$_2$.HCl: C, 54.56; H, 4.58; N, 4.90. Found: C, 54.25; H, 4.59; N, 4.86.

D. 5-(p-Chlorophenyl)-2-furamidine Hydrochloride

To a stirring solution of 21 g (0.81 mole) of anhydrous NH$_3$ in 500 ml of anhydrous CH$_3$OH was added 103 g (0.36 mole) of C. The mixture was refluxed for one hour with dissolution. Refluxing was continued for 16 hr, and a precipitate formed. The reaction mixture was allowed to stand for 24 hours, was filtered, and was dried in a vacuum oven (oil pump) at 50° to yield 74 g (80 percent). An analytical sample was prepared by drying a sample in the vacuum pistol with refluxing CHCl$_3$, m.p. 306°–308° (Mel-Temp).

Anal. Calcd. for C$_{11}$H$_9$ClN$_2$O.HCl: C, 51.38; H, 3.92; N, 10.90. Found: C, 51.37; H, 3.99; N, 10.87.

EXAMPLE IV 5-(3-Trifluoromethylphenyl)-2-furamidine Hydrochloride

A mixture of 5-(3-trifluoromethylphenyl)-2-furaldehyde, hydroxylamine hydrochloride (30 g, 0.50 mole) and anhydrous sodium acetate (41 g, 0.50 mole) in 750 ml ethanol and 75 ml water was heated under reflux for 3½ hr. After cooling, the mixture was poured into 1250 ml of cold water. The solid which was deposited was collected by filtration and air dried to give 54 g (84 percent) of the oxime, m.p. 70°–72°.

A stirred solution of 54 g (0.21 mole) of 5-(3-trifluoromethylphenyl)-2-furaldehyde oxime and 550 ml of acetic anhydride was refluxed for 2½ hr. The solution was cooled, stirred overnight, and poured into 3 l. of ice water. The brown oil solidified after stirring overnight and yielded 51 g (100 percent) of the nitrile. A small sample was recrystallized twice from cyclohexane, m.p. 61°–64°.

A stirring solution of 45 g (0.19 mole) of 5-(3-trifluoromethylphenyl)-2-furonitrile in 775 ml absolute ethanol was treated with hydrogen chloride gas for three hr, with a solid forming. The solid, after standing overnight, was filtered, washed on the funnel with ether and dried in a desiccator to yield 27 g (44 percent) of imidate hydrochloride.

Ethyl 5-(3-trifluoromethylphenyl)-2-furimidate hydrochloride (27 g, 0.085 mole) was added in portions to a stirred solution of 17 g (1.0 mole) of NH$_3$ gas which was previously bubbled into 400 ml of cold absolute ethanol. The mixture was heated under reflux for 5 hr and stored in a refrigerator overnight. The resulting solid was filtered yielding 19 g (75 percent, 25 percent overall) of title compound, m.p. 281°–283°.

Anal. Calcd. for C$_{12}$H$_9$F$_3$N$_2$O.HCl: C, 49.58; H, 3.47; N, 9.64. Found: C, 49.69; H, 3.46; N, 9.54.

EXAMPLE V

5-Phenyl-2-furamidine Hydrochloride

A solution of hydroxylamine hydrochloride (20 g, 0.29 mole) in H$_2$O (50 ml) was added to a solution of 5-phenyl-2-furaldehyde (50 g, 0.29 mole) in ethanol (150 ml) with stirring. The light yellow product was collected by filtration, yield: 48 g (89 percent) of oxime. A sample was recrystallized from isopropanol, m.p. 182°–184°.

Anal. Calcd. for C$_{11}$H$_9$NO$_2$: C, 70.58; H, 4.64; N, 7.48. Found: C, 70.35; H, 4.83; N, 7.37.

A stirred mixture of 5-phenyl-2-furaldehyde oxime (39 g, 0.21 mole) and benzene (850 ml) was heated under reflux, and a solution of POCl$_3$ (7 ml, 0.1 mole) in benzene (20 ml) was added dropwise over 30 min. The mixture was refluxed for an additional 1½ hrs and filtered while hot. The filtrate was washed with 5% NaHCO$_3$ (800 ml), H$_2$O (800 ml), dried over MgSO$_4$ and Darco, and filtered. The filtrate was stripped of solvent under reduced pressure; yield: 29 g (88 percent) of nitrile.

Dry HCl was passed into a solution of 5-phenyl-2-furonitrile (10 g, 0.06 mole) in ethanol (75 ml) with stirring at 10°–15° over 1¾ hr until saturated. The product was collected by filtration; yield: 9 g (60 percent) of imidate hydrochloride.

Ethyl 5-phenyl-2-furimidate hydrochloride (25 g, 0.10 mole) was added in portions to a stirred solution of ammonia (10 g) in anhydrous methanol (250 ml). The mixture was stirred for ½ hr at room temperature then refluxed for 1½ hr, reduced in volume to 75 ml and cooled overnight. The product was collected by filtration; yield: 12 g (54 percent) of title compound. A sample was recrystallized from isopropanol, m.p. 235°–237°.

Anal. Calcd. for C$_{11}$H$_{10}$N$_2$O.HCl: C, 59.33; H, 4.98; N, 12.58. Found: C, 59.35; H, 5.01; N, 12.63.

EXAMPLE VI 5-(3-Chloro-4-methylphenyl)-2-furamidine Hydrochloride

A. 5-(3-Chloro-4-methyl)-2-furaldehyde Oxime

To a mixture of 200 g (1.41 m.) of 3-chloro-4-methylaniline in 250 ml of water was added 430 ml (5 m.) of concentrated HCl. Solid set up very readily and an additional 500 ml of water was added to allow stirring. The mixture was cooled down to −5° −0° and a solution of 97.5 g (1.41 m.) of sodium nitrite in 320 ml of water was added in about 1 hr while keeping the temperature at −5°–2°. The mixture was allowed to stir at the same temperature range for 1½ hr and then 278 g (2.82 m.) of furfural in about 500 ml of water and 28 g (0.16 m.) of cupric chloride dihydrate in 150 ml of water was added. The ice bath was removed and the mixture was allowed to stir for 1¼ hr at ambient temperature. The mixture was then warmed to about 40°. Bubbling started and the temperature of the reaction mixture went up very quickly from 40° to 55° in about 10 min. The mixture was cooled down by means of an ice bath to about 30° and then allowed to stir overnight.

The reaction mixture was then extracted with toluene and the toluene extract was washed with water. After drying over $MgSO_4$, toluene was evaporated in a water bath at reduced pressure to a dark viscous liquid. Extraction with hot hexane repeatedly left a black tarry material which was discarded. Yellow solid separated from hexane extract on cooling. Recrystallization of the yellow solid from hexane gave a total of 43.9 g (14 percent) of 5-(3-chloro-4-methyl)-2-furaldehyde. The solid was then heated at reflux with 28 g (0.4 m.) of hydroxylamine hydrochloride, 54.5 g (0.4 m.) of sodium acetate trihydrate in 1 l. of ethanol and 60 ml of water. After 4 hr of reflux, the mixture was cooled and poured onto crushed ice. Light greenish solid separated and was collected, washed well with water and air dried. The solid weighed 46 g, m.p. 136°–141°. Recrystallization from 1.2 l. of nitromethane gave 36 g of 5-(3-chloro-4-methyl)-2-furaldehyde oxime.

B. 5-(3-Chloro-4-methyl)-2-furonitrile

A mixture of 34 g of 5-(3-chloro-4-methyl)-2-furaldehyde oxime in 340 ml of acetic anhydride was heated at reflux for 3 hr. After cooling, the reaction mixture was poured onto crushed ice. The solid was collected, washed well with water and air dried. The yield was 30.8 g (98 percent). Recrystallization of 26.8 g from hexane gave 23.8 g of 5-(3-chloro-4-methyl)-2-furonitrile. An analytical sample melted at 101°– 103°.

C. 5-(3-Chloro-4-methyl)-2-furamidine Hydrochloride

Into a mixture of 21.8 g (0.1 m.) of 5-(3-chloro-4-methyl)-2-furonitrile in 400 ml of absolute ethanol was bubbled dry hydrogen chloride gas for 2 hr. After cooling, the mixture was filtered. Anhydrous ether was added to the filtrate until cloudy and the mixture was further cooled. The solid was collected, washed with anhydrous ether and dried in a vacuum desiccator. The yield of the imidate hydrochloride was 14 g. Concentration of the filtrate gave a second crop of 6 g.

A mixture of 20 g (0.66 m.) of the above imidate .HCl and 80 g of anhydrous ammonium acetate in 550 ml of absolute ethanol was heated at reflux for 6½ hr. The mixture was then poured onto crushed ice and the solution was made slightly alkaline with concentrated $NH_4OH$. After concentration of this mixture to about half of its original volume, the addition of more water gave 17 g of the free base of F-829. Trituration of this solid in 300 ml of ethanolic HCl gave 13.5 g (50 percent) of title compound. An analytical sample melted at 307° – 310° dec.

Anal. Calcd. for $C_{12}H_{11}ClN_2O.HCl$: C, 53.15; H, 4.46; N, 10.33. Found: C, 53.11; H, 4.46; N, 10.24.

EXAMPLE VII 5-(o-Nitrophenyl)-2-furamidine Hydrochloride

A mixture of o-nitroaniline (138 g, 1.0 mole), 200 ml water and 450 ml conc. hydrochloric acid was heated on a steam bath for 15 minutes then cooled below 0°C, before a solution of sodium nitrite (70 g in 300 ml water) was added without raising the temperature above 5°. The solution was stirred for 0.5 hr, then furfural (96 g in 100 ml acetone) followed by cupric chloride dihydrate (20 g in 80 ml water) was rapidly added. The solution was stirred with an ice bath overnight, and the gummy solid was collected and stirred in 2-propanol (1 l.) to yield 100 g (46 percent) of crude aldehyde, m.p. 90°–92°.

5-(o-Nitrophenyl)-2-furaldehyde (98 g, 0.45 mole), hydroxylamine hydrochloride (63 g, 0.90 mole), and sodium acetate (74 g, 0.90 mole) was stirred in ethanol (1600 ml) and water 160 ml). The mixture was heated under reflux for 3.5 hours, then poured into cold water (2300 ml). The solid was collected by filtration to yield 98 g (93 percent) of oxime. Two g were recrystallized from toluene to yield a sample of analytical purity, m.p. 119°–121°.

5-(o-Nitrophenyl)-2-furaldehyde oxime (93 g, 0.40 mole) was stirred under reflux for 2.5 hrs. in acetic anhydride (930 ml). The cooled solution was poured into 4 l. of ice water and stirred overnight. The brown solid was collected by filtration to yield 71 g of nitrite. Recrystallization from cyclohexane yielded 65 g (75 percent) of product of analytical purity after drying in a 60° oven, m.p. 89°–91°.

A stirring solution of 5-(o-nitrophenyl)-2-furonitrile (60 g, 0.28 mole) in 1100 ml absolute ethanol was treated with hydrogen chloride gas for 3.5 hrs, with a solid forming. The flask was stored in a refrigerator overnight, the solid filtered, washed with ether and placed in a vacuum desiccator overnight to yield 35 g (42 percent) of imidate hydrochloride.

Ethyl 5-(o-nitrophenyl)-2-furimidate hydrochloride (35 g, 0.12 mole) was added to a stirred solution of cold anhydrous ethanol (900 ml) containing 22 g (1.29 mole) of ammonia. The yellow suspension was stirred overnight, and then the reaction mixture was heated at reflux for 5 hours and filtered hot. The filtrate was concentrated for two more crops to yield 25 g of title compound (76 percent, 9 percent overall), m.p. 293°–296°.

Anal. Calcd. for $C_{11}H_9N_3O_3.HCl$: C, 49.35; H, 3.76; N, 15.70. Found: C, 49.38; H, 3.85; N, 15.68.

EXAMPLE VIII 5-(p-Hexyloxyphenyl)-2-furamidine Hydrochloride

A mixture of p-hexyloxyaniline hydrochloride (230 g, 1.0 mole) in $H_2O$ (100 ml) and concentrated HCl (270 ml) was diazotized by dropwise addition of a solution of $NaNO_2$ (72 g, 1.04 mole) in $H_2O$ (200 ml), with the pot temperature kept below 10°. The mixture was stirred for 1 hr and furfural (120 g, 1.26 mole) in $H_2O$ (200 ml) was added, followed by a solution of $CuCl_2$ (23 g) in $H_2O$ (200 ml). The mixture was stirred at 35°–45°for 4 hrs. The product was extracted with ether (1400 ml), dried overnight over $MgSO_4$ and Darco, filtered and the filtrate stripped of solvent under reduced pressure. The residue was distilled in vacuo, collecting the 5-(p-hexyloxyphenyl)-2-furaldehyde at 195°–215° at 1.5 mm Hg, yield: 60 g (22 percent).

A solution of hydroxylamine hydrochloride (15.2 g, 0.22 mole) in H₂O (38 ml) was added to a solution of 5-(p-hexyloxyphenyl)-2-furaldehyde (60 g, 0.22 mole) in ethanol (130 ml). The mixture was warmed to 50°, removed from the heat, and stirred for ¾ hr. The oxime was collected by filtration and recrystallized from ethanol (300 ml), yield, 32 g (51 percent).

A stirred mixture of 5-(p-hexyloxyphenyl)-2-furaldehyde oxime (27 g, 0.06 mole) and benzene (300 ml) was heated to reflux and a solution of POCl₃ (3 ml) in benzene (15 ml) was added dropwise over 15 min. The mixture was refluxed for 1½ hrs and filtered while hot. The filtrate was washed with 5 percent NaHCO₃ (300 ml), H₂O (300 ml), dried over MgSO₄ and Darco, filtered and the filtrate stripped of solvent. The nitrile was recrystallized from petroleum ether; m.p. 48°–50°; yield: 14 g (87 percent).

Anal. Calcd. for $C_{11}H_{19}NO_2$: C, 75.81; H, 7.11; N, 5.20. Found: C, 75.58; H, 7.17; N, 4.91.

Dry HCl was passed into a solution of 5-(p-hexyloxyphenyl)-2-furonitrile (23 g, 0.23 mole) in absolute ethanol (75 ml) at 10°–15° over 3 hrs until saturated. The ice bath was removed and the mixture stirred for another 2 hours. The imidate hydrochloride was collected by filtration; yield: 25 g (83 percent).

A mixture of ethyl 5-(p-hexyloxyphenyl)-2-furimidate hydrochloride (25 g, 0.70 mole), ammonium acetate (80 g) and absolute alcohol (550 ml) was refluxed for 6½ hrs and stored over the weekend at room temperature. The mixture was poured onto ice, adjusted to pH 8 with NH₄OH and concentrated to one-half its volume under reduced pressure. More water (800 ml) was added and the product collected by filtration. The material was dissolved in ethanol (100 ml), the solution adjusted to pH 2 with ethanol-HCl, stirred for ½ hr and the title product collected by filtration; yield: 121.4 g (50 percent). A sample was recrystallized from isopropanol, m.p. 240°–244°.

Anal. Calcd. for $C_{17}H_{22}N_2O_2 \cdot HCl$: C, 63.24; H, 7.18; N, 8.68. Found: C, 63.35; H, 7.22; N, 8.52.

EXAMPLE IX 5-(3,4-Dichlorophenyl)-2-furamidine Hydrochloride

A mixture of 5-(3,4-dichlorophenyl)-2-furaldehyde (241 g, 1.0 mole), hydroxylamine hydrochloride (140 g, 2.0 moles) and anhydrous sodium acetate (165 g, 2.0 moles) in ethanol (3.5 l) and water (0.35 l) was refluxed for 3.5 hr, cooled to room temperature, and poured into water (5.0 l). The resulting solid was collected and air-dried to yield 189 g of oxime derivative (74 percent), m.p. 134°–136°.

A stirred solution of the oxime (40 g, 0.15 mole) in acetic anhydride (0.40 l) was refluxed for 2.5 hr, allowed to cool overnight and poured into water (23. l) to yield a brown gummy solid. The solid was collected, dried, and recrystallized from toluene to give 15 g of nitrile (40 percent) in two crops, m.p. 149°–151°.

The above nitrile (23 g, 0.072 mole) was stirred in absolute ethanol (290 ml) while HCl gas was bubbled in for one hr. Solid formed and was filtered off to give 17 g (75 percent) of imidate hydrochloride.

The above imidate hydrochloride (17 g, 0.054 mole) was placed in a solution of absolute ethanol containing ammonia (5 g, 0.3 mole) and the solution was refluxed for five hours. The mixture was cooled to yield 7.4 g of amidine hydrochloride. Concentration of the filtrate yielded 5.3 g more product, giving a yield of 12.8 g (81 percent, or 18 percent overall yield), m.p.>300°.

Anal. Calcd. for $C_{11}H_8Cl_2N_2O \cdot HCl$: C, 45.31; H, 3.11; N, 9.61. Found: C, 45.37; H, 3.21; N, 9.34.

EXAMPLE X 5-(p-Dimethylaminophenyl)-2-furamidine Hydrochloride Tetartohydrate

A. 5-(p-Dimethylaminophenyl)-2-furaldehyde Oxime

To a solution of N, N-dimethyl-p-phenylenediamine (97 g, 0.71 mole) in conc. HCl (570 ml) was added a solution of sodium nitrite (49 g, 0.71 mole) in H₂O (277 ml) at 1°–5° over 75 min with mechanical stirring. The temperature of the reaction mixture was allowed to rise to 18° in 10 min, treated with 2-furaldehyde (65 ml, 0.78 mole) at 18°–19° in 1 min, and then treated rapidly with a solution of $CuCl_2 \cdot 2H_2O$ (28.4 g, 0.17 mole) in H₂O (150 ml) at 19°–19.5°. The mixture was warmed to 25° in 7 min, stirred at room temperature for 4 days, extracted with ether (5 × 400 ml), Darcoed for 20 min, and filtered. The filtrate was treated with a solution of $H_2NOH \cdot HCl$ (49 g, 0.71 mole) in H₂O (130 ml) and heated to 55° over 15 min. An additional 48 g of $H_2NOH \cdot HCl$ was added to the mixture and heated to 68° over 20 min with hand stirring. The cooled solution was added to ice (1000 ml) stored in an ice bath for 4 hr, and the resultant crude oxime was collected, and washed with cold H₂O (4 × 20 ml), cold isopropanol (4 × 25 ml), ether, yield: 21 g. The crude product was treated with H₂O (100 ml), solid NaHCO₃ (130 ml), and ether, cooling in an ice bath. The mixture was further extracted with ether (1500 ml); the extract was dried over MgSO₄ and Darco, filtered and concentrated nearly to dryness under reduced pressure. The residue was cooled and filtered to give the oxime, m.p. 209°–213°, yeild 2.0 g. The aqueous phase yielded additional oxime (0.9 g, m.p. 208°–212°) upon treatment with 20 percent NaOH followed by extraction with ether. Additional product (2.6 g, m.p. 204°–207°) was obtained through concentration of the aqueous phase to a volume of 250 ml, basification with 20 percent NaOH (276 ml), and extraction with ether. Total yield: 4.9 g (3.3 percent).

Anal. Calcd. as $C_{18}H_{14}N_2C_2$: C, 67.81; H, 6.13; N, 12.17. Found: C, 68.00; H, 6.16; N, 12.18.

B. 5-(p-Dimethylaminophenyl)-2-furonitrile

A mixture of the above oxime (4.2 g, 0.018 mole) and benzene (100 ml) was treated with a solution of POCl₃ (1.5 ml, 0.016 mole) in benzene. The mixture was refluxed on the steam bath for 1.5 hr, until the rate of evolution of HCl had greatly decreased. The reaction mixture was cooled in an ice bath and treated with H₂O (60 ml), ether (200 ml) and solid NaHCO₃ (25 g). The ether extract was dried over MgSO₄ and Darco, filtered, and concentrated to dryness under reduced pressure. Recrystallization from ether (120 ml) gave the product; m.p. 162.164°, yield: 1.3 g. An additional 0,6 g of product (m.p. 158°–159°) was recovered from the filtrate. Total yield: 1.9 g (50 percent).

Anal. Calcd. as $C_{13}H_{12}N_2O$: C, 73.56; H, 5.70; N, 13.20. Found: C, 73.44; H, 5.64; N, 13.13.

C. Methyl 5-(p-Dimethylaminophenyl)-2-furimidate Hydrochloride

A mixture of the above 2-furonitrile (2.1 g, 0.010 mole) and anhydrous CH₃OH (40 ml) was treated with dry HCl at 10°–15° over 1 hr and stored at room temperature for 2 hr. The resultant cream-colored solid product was collected by filtration and washed with CH₃OH, yield: 2.2 g (79 percent).

D. 5-(p-Dimethylaminophenyl)-2-furamidine Hydrochloride Tetrahydrate

To a mixture of NH₄OAc (10 g, 10.3 mole) and absolute ethanol (50 ml) was added to the above 2-furimidate (2.2 g, 0.078 mole) with mechanical stirring. The mixture was refluxed for 5 hr, stored at room temperature over the weekend, and filtered to remove any inorganic solids. The filtrate was treated with a solution of dry HCl-isopropanol to a pH of 2-3, cooling in an ice bath. The resultant crude product was collected and washed with cold ethanol, ether; yield 3.6 g.

Anal. Calcd. at $C_{13}H_{15}N_3O \cdot 1/4\ H_2O$: C, 57.74; H, 6.15; N, 15.55. Found: C, 58.02; H, 6.22; N, 15.52.

EXAMPLE XI

Ethyl p-[(5-Amidino)-2-]benzoate Hydrochloride

A solution of ethyl p-aminobenzoate (165 g, 1.0 mole) in H₂O (200 ml) and concentrated HCl (450 ml) was diazotized by dropwise addition of a solution of NaNO₂ (70 g) in H₂O (280 ml) with the pot temperature kept below 5°. The mixture was stirred for 1½ hrs, then furfural (96 g) was added followed by a solution of CuCl₂ (23 g) in H₂O (100 ml). The mixture was stirred at 15°-20° for 3 hrs, then at 35°-45° for 2 hrs and stored overnight at room temperature. The product was extracted with ether (200 ml); dried overnight over MgSO₄ and Darco, filtered and the filtrate stripped of solvent under reduced pressure. The residue was extracted with hot hexane (2 l.) and the extract was stripped of solvent under reduced pressure; yield: 89 g (36 percent) of 5-(p-ethoxycarbonylphenyl)-2-furaldehyde.

Ethanol (400 ml) was added to 5-(p-ethocycarbonylphenyl)-2-furaldehyde (89 g, 0.36 mole) and the mixture was filtered. To the filtrate was added a solution of hydroxylamine hydrochloride (25 g, 0.36 mole) in H₂O (60 ml). The mixture was stirred for 1 hr, then cooled and the oxime was collected by filtration; yield: 24 g (26 percent).

A stirred mixture of 5-(p-3thoxycarbonylphenyl)-2-furaldehyde oxime (24 g, 0.09 mole) and benzene (400 ml) was heated to reflux and a solution of POCl₃ (4 ml) in benzene (20 ml) was added slowly over 10 min. The mixture refluxed for an additional 1½ hrs and filtered while hot. The filtrate was washed with 5 percent NaHCO₃ (500 ml), H₂O (500 ml), dried over MgSO₄ and Darco, filtered, and the filtrate stripped of solvent under reduced pressure; yield: 20 g (89 percent) of nitrile.

Dry HCl was passed into a solution of ethyl p-[(5-cyano)-2-furyl] benzoate (20 g, 0.83 mole) in absolute ethanol (100 ml) with stirring at 10°-15° over 1½ hrs until saturated. The mixture was filtered, the filtrate stored at room temperature for 3 hrs and the imidate hydrochloride was collected by filtration; yield: 8 g (31 percent).

Ethyl 5-(p-ethoxycarbonylphenyl)-2-furimidate hydrochloride (14 g, 0.04 mole) was added in portions to a stirred solution of ammonia (11 g) in absolute methanol (200 ml). The mixture was stirred for 17 hrs at room temperature and then stripped of solvent under reduced pressure; yield: 7.5 g (59 percent) of title product. A sample was recrystallized from isopropanol, m.p. 293°-296°.

Anal. Calcd. for $C_{14}H_{14}N_2O_3 \cdot HCl$: C, 57.05; H, 5.13; N, 9.51. Found: C, 57.01; H, 5.15; N, 9.37.

EXAMPLE XII 5-(p-Methylphenyl)-2-furamidine Hydrochloride

A mixture of p-toluidine (216 g, 2.0 moles) in H₂O (400 ml) and concentrated HCl (540 ml) was diazotized by dropwise addition of solution of NaNO₂ (144 g, 2.08 moles) in H₂O (400 ml) with the pot temperature kept below 10°. The mixture was stirred for ½ hr and furfural (246 g, 2.56 moles) was added followed by a solution of CuCl₂ (46 g) in H₂O (300 ml). The stirred mixture was heated at 40°-50° for 5 hrs and stored overnight at room temperature. The product was extracted with ether (1200 ml), dried overnight over MgSO₄ and Dacro, filtered and the filtrate stripped of solvent under reduced pressure. The residue was distilled in vacuo, collecting the product at 160°-180°/1.4 mm Hg; yield: 70 g (19 percent) of 5-(p-methylphenyl)-2-furaldehyde.

A solution of hydroxylamine hydrochloride (26 g, 0.38 mole) in H₂O (65 ml) was added to a solution of 5-(p-methylphenyl)-2-furaldehyde (70 g, 0.38 mole) in absolute alcohol (200 ml), then stirred for 20 min and cooled overnight. The oxime was collected by filtration; Yield: 60 g (79 percent).

A stirred mixture of 5-(p-methylphenyl)-2-furaldehyde oxime (60 g, 0.39 mole) and benzene (1200 ml) was heated to reflux and a solution of POCl₃ (11 ml) in benzene (30 ml) was added dropwise over 15 min. The mixture was refluxed for an additional 1½ hrs and filtered while hot. The The filtrate was washed with 5 percent NaHCO₃ (700 ml), H₂O (700 ml), dried over MgSO₄ and Darco, filtered and the filtrate stripped of solvent under reduced pressure; yield 42 g (76 percent) of nitrile.

Dry HCl was passed into a solution of 5-(p-methylphenyl)-2-furonitrile (27 g, 0.15 mole) in absolute methanol (200 ml) with stirring at 10°-15° over 1¾ hr until saturated. The imidate hydrochloride was collected by filtration and washed with ether; yield: 16 g (40 percent).

Methyl 5-(p-methylphenyl)-2-furimidate hydrochloride (16 g, 0.06 mole) was added in portions to a stirred solution of ammonia (10 g) in anhydrous methanol (150 ml). The mixture was stirred overnight at room temperature, stripped of solvent under reduced pressure, the residue washed with acetone and the product recrystallized from isopropanol, m.p. 280°-283°; yield: 7.2 g (50 percent) of title product.

Anal. Calcd. for $C_{12}H_{12}N_2O \cdot HCl$: C, 60.89; H, 5.54; N, 11.84. Found: C, 60.83; H, 5.54; N, 11.79.

EXAMPLE XIII 5-(p-Fluorophenyl)-2-furamidine Hydrochloride 5-(p-Fluorophenyl)-2-furaldehyde (82 g, 0.43 mole), hydroxylamine hydrochloride (60 g, 0.86 mole), anhydrous sodium acetate (70.5 g, 0.86 mole), ethanol (1500 ml) and water (150 ml) was heated under reflux for 3.5 hr. The cooled mixture was poured into cold water (2 l), and the light yellow solid collected by filtration and dried in a 60° oven overnight to yield 77 g (86 percent) of product oxime. A sample was recrystallized from toluene to give a product of analytical purity, m.p. 130°-133°.

A stirred solution of 5-(p-fluorophenyl)-2-furaldehyde oxime (76 g, 0.37 mole) and acetic anhydride (760 ml) was refluxed for 2.5 hr. The solution was cooled, poured into ice water (4 l) and stirred overnight. The brown solid nitrile was collected by filtration and recrystallized from cyclohexane to yield 44.5 g (62 percent) of nitrile of analytical purity, m.p. 68°–70°.

A stirring solution of 5-(p-fluorophenyl)-2-furonitrile (44.5 g, 0.24 mole) in absolute ethanol (950 ml) was treated with hydrogen chloride gas for 3.5 hr, with a solid forming upon cooling. The white solid was filtered, washed with ether, and placed in a vacuum desiccator to yield 53 g (78 percent) of imidate hydrochloride.

Ethyl 5-(p-fluorophenyl)-2-furimidate hydrochloride (53 g, 0.19 mole) was added to cold absolute ethanol (1 l) containing 48 g (2.8 mole) of ammonia gas. The solution was refluxed for five hr, filtered hot, and refrigerated overnight to yield 25 g (53 percent, 23 percent overall) of title compound, m.p. 269°–271°.

Anal. Calcd. for $C_{11}H_9F_2O.HCl$: C, 54.89; H, 4.19; N, 11.64. Found: C, 54.94; H, 4.20; N, 11.53.

EXAMPLE XIV 5-(o-Aminophenyl)-2-furamidine Dihydrochloride

A mixture of 5-(o-nitrophenyl)-2-furamidine hydrochloride (14.7 g, 0.055 mole) and absolute methanol (500 ml) was shaken in the presence of 5 percent Pd/C (50 percent $H_2O$, 2 g) under hydrogen pressure, with less than the theoretical uptake of hydrogen (theory 11 lbs., actual 9). The mixture was filtered to separate the catalyst, and the yellow filtrate was diluted with anhydrous ether (700 ml) and cooled overnight to yield 10 g.

The product was impure and 9 g (0.037 mole) in absolute methanol (250 ml) was shaken in the presence of 5 percent Pd/C ($H_2O$) (2 g) under hydrogen pressure for 1 hr with an uptake of 5 lbs. more. The catalyst was filtered, and the filtrate was concentrated to 100 ml. The first crop was precipitated out with anhydrous ether (250 ml), and the second crop crystallized out upon standing to produce a sample of monohydrochloride salt of analytical purity.

The combined 5-(o-aminophenyl)-2-furamidine hydrochloride was added to 10 ml ethanolic hydrogen chloride and 100 ml of ether. The offwhite solid was stirred for ½ hr., filtered, and placed in a vacuum desiccator to yield 3.1 g (21 percent). m.p. 250°–252°.

Anal. Calcd. for $C_{11}H_{11}N_3O.HCl$: C, 48.19; H, 4.78; N, 15.33. Found: C, 48.25; H, 4.86; N, 15.22.

EXAMPLE XV 5-(p-Hydroxyphenyl)-2-furamidine Hydrochloride

A. 5-(p-Benzyloxyphenyl)-2-furaldehyde

A mixture of 236 g (1.0 m.) of p-benzyloxyaniline hydrochloride in 1.5 l of water and 230 ml of conc. HCl was warmed on a steam bath for 1½. No solution was effected. The mixture was then cooled down to 0°–5° and a solution of 75.9 g (1.1 m.) of sodium nitrite in 500 ml of water was added in about 1 hr while keeping the temperature at 4°–7°. The mixture was allowed to stir further for an additional 45 min while the temperature gradually rose to 10°. Furfural (192 g, 2 m.) and 55 g of cupric chloride dihydrate in a minimum amount of water was added and the mixture was allowed to stir at ambient temperature overnight. Solid started to separate after two days of stirring. The solid was collected, washed well with water. The filtrate and the water washings were combined and allowed to stir for an additional four days while more solid separated. The dark gummy solids were combined, triturated with ether, filtered and air dried. Repeated recrystallizations from hot cyclohexane gave 48.5 g (17.5 percent).

B. 5-(p-Benzyloxyphenyl)-2-furonitrile

A mixture of 34.6 (0.125 m.) of 5-(p-benzyloxyphenyl)-2-furaldehyde, 17.3 g (0.25 m.) of hydroxylamine hydrochloride and 20.4 g (0.25 m.) of anhydrous sodium acetate in 900 ml of ethanol and 80 ml of water was heated at reflux for 5 hr. After cooling, the mixture was poured into ice water and solid separated very readily. The solid was collected, washed with water and air dried. The yield of oxime was 33 g (91 percent).

A mixture of 38.5 g (0.131 m.) of the above oxime in 400 ml of acetic anhydride was heated at reflux for 3 hr. After cooling, the reaction solution was poured onto crushed ice wiith stirring. Oily material gradually solidified. The solid was collected, washed with water and dried to givie 40.5 g of crude product. Recrystallization from 4 l of hexane gave 30 g (83 percent) of 5-(p-benzyloxyphenyl)-2-furonitrile.

C. 5-(p-Hydroxyphenyl)-2-furamidine Hydrochloride

The above nitrile (30 g, 0.109 m.) was placed in 1 l of absolute ethanol and dry hydrogen chloride gas was bubbled into the mixture for 4 hr. The mixture was filtered and the solid was washed with anhydrous ether and dried in a vacuum desiccator. Two more crops were collected from the filtrate upon the addition of anhyrous ether. The yield of the imidate hydrochloride was 26.2 g. This solid was placed in 500 ml of absolute ethanol containing 23 g of anhydrous ammonia and the mixture was heated at reflux for 4½ hr. After cooling, the reaction mixture was filterd and the solid was washed with ether and air dried. More solid separated from the filtrate upon addition of ether. The combined yield of three crops of 5-(p-benzyloxyphenyl)-2-furamidine hydrochloridie was 16.6 g.

A mixture of the above solid in 150 ml of ethanol together with 2 g of 5 percent palladium on carbon (50 percent water) was subjected to reduction. After theoretical hydrogen uptake, the mixture was warmed on a steam bath with additional ethanol added and filtered hot. The filtrate was concentrated at reduced pressure to about 50 ml, and off white solid separated. The solid was collected, washed with ether and air dried. The yield was 11.3 g (43.5 percent).

An analytical sample melted at 334°–336° with decomposition.

Anal. Calcd. for $C_{11}H_{10}N_2O_2.HCl$: C, 55.35; H, 4.65; N, 11.74. Found: C, 55.14; H, 4.73; N, 11.45.

EXAMPLE XVI 5-(p-Isopropylphenyl)-2-furamidine Hydrochloride p-Nitrocumene (99 g, 0.60 mole) and 5% Pd/C (50 percent $H_2O$, 10 g) were shaken in ethanol under 40 psi $H_2$ on a Parr apparatus, with reduction proceeding slowly to theory of 3 mole - equivalents of hydrogen. The catalyst was removed by filtration and the filtrate was brought to 600 ml volume with ethanol.

A 150 ml portion of the above reduction solution was concentrated to an oily residue. The residue in a solution of conc. HCl (70 ml) and water (30 ml) was diazotized at 0°–5° by dropwise addition of sodium nitrite, (10 g, 0.15 mole) in water. To this filtered diazotized solution was added furfural (14 g. 0.14 mole), acetone (15 ml), and cupric chloride dihydrate (3 g) in water (5 ml). The solution was stirred at ambient conditions for 5 days. Then the solution was extracted with three 100 ml portions of ether. The organic extract was washed with water (100 ml) and three 50 ml portions of 1 percent sodium hydroxide solution. The ether layer was dried (MgSO$_4$) and concentrated to a black oil under reduced pressure. The oil was heated at 93°–97° on a rotary evaporator under reduced pressure for 1 hr. Then the oil was dissolved in ethanol (200 ml), and hydroxylamine hydrochloride (10 g, 0.15 mole) and sodium acetate (12 g, 0.15 mole) were added. The stirred mixture was heated at reflux for 3½ hrs, cooled, and poured into cold water (500 ml). The resulting gummy solid was extracted with three 100 ml portions of ether and concentrated to a dark oil. Stirring with cyclohexane yielded solid oxime, m.p. 153°–157°. The above synthesis of the oxime from the p-isopropylaniline was repeated three times on the same scale to yield 6.0 g of oxime (4.5 percent yield, based upon p-nitrocumene).

The oxime (6.0 g, 0.026 mole) was refluxed in acetic anhydride (60 ml) for 2½ hrs. The mixture was cooled, poured into ice water (500 ml), and stirred overnight. The gummy solid was extracted with three 100 ml portions of ethyl acetate, and the extract was dried (MgSO$_4$) and concentrated to a black gum. Dissolution in hot hexane and subsequent cooling by refrigeration yielded the desired nitrile (3.0 g, 55 percent), m.p. 44°–46°.

Methanol (50 ml) was saturated with HCl gas and cooled to 26°. The 5-(p-isopropylphenyl)-2-furonitrile (3.0 g, 0.014 mole) was added and the mixture was stirred 4 hrs and allowed to stand overnight. Addition of ether (200 ml) yielded off-white solid which was collected. This imidate hydrochloride was added to a solution of ammonia (1.4 g, 0.1 m.) in methanol (50 ml) and the mixture was stirred for six hrs at reflux. Upon cooling, ether (200 ml) was added and the resulting amidine hydrochloride (0.65 g, 17 percent, 0.42 percent overall yield) was collected, m.p. 270°–272°.

Anal. Calcd. for C$_{14}$H$_{16}$N$_2$O.HCl: C, 63.51; H, 6.47; N, 10.58. Found: C, 63.11; H, 6.51; N, 10.57.

EXAMPLE XVII 5-(p-Methylthiophenyl)-2-furamidine Hydrochloride

A solution of 4-methylthioaniline hydrochloride (175 g, 1.0 mole) in H$_2$O (200 ml) and concentrated HCl (450 ml) was diazotized by dropwise addition of a solution of NaNO$_2$ (70 g) in H$_2$O (200 ml) and concentrated HCl (450 ml) was diazotized by dropwise addition of a solution of NaNO$_2$ (70 g) in H$_2$O (280 ml), with the pot temperature kept below 10°. The mixture was stirred for ½ hr, then furfural (192 g, 2.0 moles) was added followed by a solution of CuCl$_2$ (23 g) in H$_2$O (100 ml). The mixture was stirred at ambient temperature for two days. The product was extracted with ether (1800 ml) in portions, dried over MgSO$_4$ and Darco, filtered; the filtrate stripped of solvent under reduced pressure. The residue was distilled in vacuo, collecting the 5-(p-methylthiophenyl)-2-furaldehyde at 180°–220° (1-3 mm Hg), yield: 52 g (24 percent).

A solution of hydroxylamine hydrochloride (16.5 g, 0.24 mole) in H$_2$O (35 ml) was added to a solution of 5-(p-methylthiophenyl)-2-furaldehyde (52 g, 0.24 mole) in absolute alcohol (300 ml) and stirred for 1 hr. The oxime was collected by filtration, yield: 41 g (73 percent).

A stirred mixture of 5-(p-methylthiophenyl)-2-furaldehyde oxime (41 g, 0.18 mole) and benzene (300 ml) was heated to reflux and a solution of POCl$_3$ (8 ml) in benzene (40 ml) was added dropwise over 20 minutes. The mixture was refluxed for an additional 1½ hr and filtered while hot. The filtrate was washed with 5 percent NaHCO$_3$ (500 ml), H$_2$O (500 ml), dried over MgSO$_4$ and Darco, filtered; the filtrate was stripped of solvent under reduced pressure, yield: 31 g (80 percent) of nitrile.

Dry HCl was passed into a solution of 5-(p-methylthiophenyl)-2-furonitrile (31 g, 0.15 mole) in absolute methanol (120 ml) with stirring at 10°–15° for 1½ hr until saturated. The ice bath was removed and the mixture stirred for 1 hr. The imidate hydrochloride was collected by filtration, yield: 25 g (59 percent).

Methyl 5-(p-methylthiophenyl)-2-furimidate hydrochloride (25 g, 0.085 mole) was added in portions to a stirred solution of NH$_3$ (10 g) in methanol (200 ml), stirred at room temperature overnight and refluxed for 1 hr. The mixture was stripped of solvent under reduced pressure and the residue was recrystallized from ethanol (400 ml). The product was washed with acetonitrile and recrystallized from tetrahydrofuran-H$_2$O (4:1), yield: 5.3 g (23 percent). A sample was recrystallized from tetrahydrofuran-H$_2$O (4:1), m.p. 284°–288°.

Anal. Calcd. for C$_{12}$H$_{12}$N$_2$OS.HCl: C, 53.62; H, 4.88; N, 10.42. Found: C, 53.33; H, 4.90; N, 10.32.

EXAMPLE XVIII 5-(5-Chloro-2-pyrimidinyl)-2-furamidine Hydrochloride

A 2 l. 3-necked flask, equipped with two condensers, was charged with 2-(2-furyl)-5-chloro-4-pyrimidinecarboxylic acid (300 g, 1.33 moles). The acid was heated to melt and held for 5-10 min. The resulting dark mass was cooled and then dissolved in 1000 ml of boiling chloroform, decolorized and filtered hot. The chloroform solution was concentrated under reduced pressure to give 238 g (98 percent) of 2-(2-furyl)-5-chloropyrimidine, m.p. 106°–109°. The analytical sample, m.p. 108°–110°, was obtained by recrystallization from heptane.

Anal. Calcd. for C$_8$H$_5$ClN$_2$O: C, 53.20; H, 2.79; N, 15.51; Cl, 19.63. Found: C, 53.05; H, 3.08; N, 15.00; Cl, 19.52.

A 3 l., 3-necked flask was charged with dimethylformamide (1000 ml) and then cooled to 10° with an external water bath. Through an addition funnel was added slowly phosphorus oxychloride (183 ml, 307 g, 2 moles). The solution was then treated with 2-(2-furyl)-5-chloropyrimidine (181 g, 1.0 moles) dissolved in dimethylformamide (600 ml). The reaction mixture was heated at 90°–100° for 8 hr and then stored in a refrigerator for 4 days. The dark suspension was poured into 5000 ml of 2 percent sodium hydroxide. An additional 450 ml of 20 percent sodium hydroxide (pH 8-9) was added. The material was stirred for 0.5 hr and then made acidic with concentrated hydrochloric acid (100 ml). After cooling for 0.5 hr, the resulting suspension was filtered and washed with water. The solid was dried at 60° for 5 hr to give 143 g (69.4 percent) of 5-(5-chloro-2-pyrimidinyl)furfural, m.p. 179°–182°. The analytical sample, m.p. 209°–210°, was obtained by recrystallization from benzene.

Anal. Calcd. for C$_9$H$_5$ClN$_2$O$_2$: C, 51.82; H, 2.42; N, 13.43. Found: C, 51.79, 51.72; H, 2.40, 2.34;

N, 13.35, 13.21.

A solution of hydroxylamine hydrochloride (3.5 g, 0.05 mole) in $H_2O$ (9 ml) was added to a solution of (10.5 g, 0.05 mole) in methanol (260 ml) and stirred for ½ hr at room temperature. The oxime was collected by filtration, yield: 10 g (91 percent). This preparation was repeated.

A stirred mixture of oxime (15 g, 0.07 mole) and benzene (380 ml) was heated to reflux and a solution of $POCl_3$ (2.5 ml) in benzene (8 ml) was added slowly over 15 minutes. The mixture was refluxed for an additional 1½ hr and filtered while hot. The filtrate was stripped of solvent under reduced pressure, yield: 11 g, (77 percent) of nitrile.

Dry HCl was passed into a solution of 5-(5-chloro-2-pyrimidinyl)-2-furonitrile (11 g, 0.049 mole) in absolute alcohol (90 ml) with stirring at 10°–15° for two hours until saturated. The mixture was stirred for an additional 1 hr and the imidate was collected by filtration, yield: 12 g, (85 percent).

A mixture of 5-(5-chloro-2-pyrimidinyl)-2-furimidate (11 g, 0.044 mole) $NH_4OAc$ (40 g) and absolute alcohol (250 ml) was refluxed for 6½ hr and stored over the weekend at room temperature. The mixture was poured onto ice (400 ml), adjusted to pH 8 with $NH_4OH$ and the mixture concentrated to one-half its volume. More $H_2O$ (400 ml) was added and the product was collected by filtration. The amidine was recrystallized from acetonitrile, dissolved in isopropanol, adjusted to pH 2 with isopropanol-HCl, cooled and the product collected by filtration; m.p. >300°.

Anal. Calcd. for $C_9H_7ClN_4O \cdot HCl$: C, 41.72; H, 3.11; N, 21.63. Found: C, 41.80; H, 3.22; N, 21.17.

EXAMPLE XIX 5-(p-1-Hhydroxyethylphenyl)-2-furamidine Hydrochloride

A. 5-(p-Acetylphenyl)-2-furonitrile 5-(p-Acetylphenyl)-2-furaldehyde (43 g, 0.2 m.) was dissolved in a mixture of 2.8 l of ethanol and 150 ml of dimethylforamide by warming on a steam bath with stirring. The slightly cloudy brown solution was cooled down to 35° and then 13.9 g (0.2 m.) of hydroxylamine hydrochloride in a minimum amount of water (50 ml) was added in about 5 min. The cloudy solution was allowed to stir at ambient temperature for 5¾ hr. After overnight standing, the reaction mixture was poured onto crushed ice. Light brown solid separated and was collected, washed with water and air dried. More solid separated from the filtrate and was also collected. The combined yield of the oxime was 43 g (93.5 percent). The solid was placed in 500 ml of acetic anhydride and heated at reflux for 4 hr. After cooling, the reaction mixture was poured onto a crushed ice and allowed to hydrolyze gradually. The brown solid was collected, washed well with water and air dried to give 37.5 g of crude material. Recrystallization from 1.1 l of methylcyclohexane gave 22 g (52.5 percent) of 5-(p-acetylphenyl)-2-furonitrile.

Recrystallization of 1 g from 100 ml of methylcyclohexane gave 0.4 g of analytically pure material, m.p. 122°–125°.

B. Methyl 5-(p-1 Hydroxyethylphenyl)-2-furimidate

To a mixture of 10.8 g (9.051 m.) of 5-(p-acetylphenyl)-2-furonitrile in 125 ml of anhydrous methanol under stirring at 15° was added portionwise 1.94 g of sodium borohydride. The temperature was maintained at 15°–22° during the addition by means of an ice water bath. A light brown solution resulted and it was allowed to stir at ambient temperature overnight. The solution was then poured onto crushed ice and yellow solid separated very readily. The solid was collected, washed well with water and air dried on the funnel. A second crop was obtained from the filtrate upon addition of more water. The combined yield was 11.35 g (91 percent). Recrystallization of 1 g from 200 ml of methylcyclohexane gave 0.8 g of pale yellow crystalline solid, m.p. 134°–136°.

C. 5-(p-1-Hydroxyethylphenyl)-2-furamidine Hydrochloride

To a solution of 8.1 g (0.033 m.) of the above imidate in 200 ml of anhydrous methanol at room temperature was added with stirring 1.77 g (0.033 m.) of solid ammonium chloride. The solid dissolved gradually and the solution was allowed to stir at ambient temperature overnight. The solution was then concentrated to dryness at reduced pressure to give a yellow solid residue. The crude product was triturated with ether, filtered and dried. The yield was 7.1 g. An analytical sample melted at 227°–228°.

Anal. Calcd. for $C_{13}H_{14}N_2O_2 \cdot HCl$: C, 58.54; H, 5.67; N, 10.50; Cl, 13.29 Found: C, 58.16; H, 5.63; N, 10.23; Cl, 13.38.

EXAMPLE XX 5-(p-Bromophenyl)-2-furamidine Hydrochloride

A mixture of p-bromoaniline (344 g. 2.0 moles) in $H_2O$ (400 ml) and concentrated HCl (900 ml) was diazotized by dropwise addition of a solution of $NaNO_2$ (140 g) in $H_2O$ (560 ml), with the pot temperature kept below 10°. The mixture was stirred for one-half hr. then furfural (192 g) was added, followed by a solution of $CuCl_2$ (46 g) in $H_2O$ (200 ml). The mixture was stirred for 20 hrs, keeping the temperature below 40°. The aqueous portion was decanted and the residue was dissolved in $CHCl_3$, dried over $MgSO_4$ and Darco, and the filtrate was stripped of solvent under reduced pressure. The residue was extracted with cyclohexane (2 l), the extract was cooled, and 5-(p-bromophenyl)-2-furaldehyde was collected by filtration. Yield: 25 g (5 percent).

A solution of hydroxylamine hydrochloride (7 g, 0.1 mole) in $H_2O$ (20 ml) was added to a solution of 5-(p-bromophenyl)-2-furaldehyde (25 g, 0.1 mole) in ethanol (150 ml) and stirred for 1 hr. The mixture was cooled overnight and the oxime was collected by filtration. Yield: 25 g (93 percent).

A stirred mixture of 5-(p-bromophenyl)-2-furaldehyde oxime (25 g, 0.1 mole) and benzene (400 ml) was heated to reflux and a solution of $POCl_3$ (6 ml) in benzene (30 ml) was added dropwise over 15 minutes. The mixture was refluxed for an additional 1½ hr and filtered while hot. The filtrate was washed with 5% $NaHCO_3$ (600 ml) and water (600 ml), dried over $MgSO_4$ and Darco and filtered. The filtrate was stripped of solvent under reduced pressure, yield: 24 g (96 percent) of nitrile.

Dry HCl was passed into a solution of 5-(p-bromophenyl)-2-furonitrile (24 g, 0.087 mole) in absolute methanol (100 ml) with stirring at 10°1  15° for 1½ hr. The ice bath was removed and the mixture was stirred for an additional 1 hr. The imidate hydrochloride was collected by filtration, yield: 17 g (59 percent).

A mixture of methyl 5-(p-bromophenyl)-2-furimidate hydrochloride (17 g, 0.057 mole), NH$_4$OAc (80 g) and absolute alcohol (550 ml) was refluxed for 6 hrs and stored overnight at room temperature. The mixture was poured onto ice, adjusted to pH 8 with NH$_4$OH, and concentrated to one-half its volume. More H$_2$O (800 ml) was added and the product was collected by filtration. The product was dissolved in isopropanol, adjusted to pH 3 with ethanol-HCl, cooled, and the amidine hydrochloride collected by filtration, yield: 4 g (23 percent).

Anal. Calcd. for C$_{11}$H$_9$BrN$_2$O.HCl: C, 43.81; H, 3.34; N, 9.29. Found: C, 43.89; H, 3.44; N, 9.00.

EXAMPLE XXI 5-(m-Aminophenyl)-2-furamidine Dihydrochloride

In a 500 ml reduction vessel were placed the compound of Example XXII (16 g, 0.060 mole), 5% Pd/C (50% water, 2.0 g), and methanol (200 ml). Reduction was carried out at an initial 30 psi and uptake of hydrogen to theory was observed in 10 min with no further uptake observed. The reduction mixture was filtered, and the filtrate was concentrated to a solid. The solid was dissolved in ethanol (200 ml) and a saturated solution of HCl/EtOH (20 ml) was introduced. A white precipitate resulted, was filtered, and was recrystallized by dissolution in hot ethanol, cooling, and adding ether until cloudy. Title product (14 g, 85%) of analytical purity was collected, m.p. 307°–309°.

Anal. Caicd. for C$_{11}$H$_{11}$N$_3$O.2HCl: C, 48.19; H, 4.78; N, 15.33. Found: C, 47.84; H, 5.01; N, 14.96.

EXAMPLE XXII 5-(m-Nitrophenyl)-2-furamidine Hydrochloride

A mixture of 5-(m-nitrophenyl)-2-furaldehyde (217 g, 1.0 mole), hydroxylamine hydrochloride (140 g, 2.0 moles), and sodium acetate (164 g, 2.0 moles) in a solution of ethanol (3,500 ml) and water (350 ml) was refluxed for 3½ hrs, allowed to cool, and poured into water (5,000 ml). The solid product was collected to yield 218 g (94 percent) of oxime. A sample was recrystallized from toluene to yield oxime.

The oxime (209 g, 0.90 mole) was allowed to reflux in acetic anhydride (2,000 ml) for 2½ hr, and the solution was cooled and poured into ice water (9,000 ml). The mixture was stirred overnight and the solid was filtered to yield 190 g (99 percent) of nitrile.

Hydrogen chloride was slowly bubbled into a stirred solution of the nitrile (64 g, 0.30 mole) in absolute ethanol (800 ml) for 8 hrs, with the temperature maintained at 33°–38°. The solution was cooled overnight and the resulting solid imidate (52 g, 59 percent) was collected and air-dried.

Ammonia (8.5 g, 0.50 mole) was dissolved in absolute ethanol. Then the imidate hydrochloride (52 g, 0.17 mole) was added, and the mixture was refluxed with stirring for 6 hrs. The solution was filtered while hot and refrigerated overnight. The crystallized solid was isolated to yield 32 g (70 percent, 38 percent yield overall) of desired amidine, m.p. 298°–300°. Concentration of the mother liquor gave additional product of analytical purity, m.p. 291°–294°.

Anal. Calcd. for C$_{11}$H$_9$N$_3$O$_3$.HCl: C, 49,36; H, 3.77; N, 15.70. Found: C, 49.36; H, 3.96; N, 15.58.

EXAMPLE XXII 5-(2,4-Dichlorophenyl)-2-furamidine Hydrochloride

A. Preparation of 5-(2,4-Dichlorophenyl)-2-furaldehyde

A mixture of 162 g (1.0 mole) of 2,4-dichloroaniline, 200 ml of water and 450 ml of hydrochloric acid was heated on a steam bath for 2 hrs and then cooled to −10°. A solution of 70 g (1.0 mole) of sodium nitrite in 750 ml of water was added dropwise while maintaining the temperature at −10°. The reaction was allowed to warm to 0° and was kept at that temperature for 45 minutes. A solution of 96 g (1.0 mole) of furfural in 100 ml of acetone was added followed by a solution of 20 g of CuCl$_2$.2H$_2$O in 30 ml of water. The cooling bath was removed and the reaction became exothermic reaching a maximum temperature of 47°. After the reaction mixture cooled to room temperature the solid was filtered, washed with water and recrystallized from isopropanol to yield 125 g (52 percent).

B. Preparation of 5-(2,4-Dichlorophenyl)-2-furaldehyde Oxime

A mixture of 121 g (0.50 mole) of 5-(2,4-dichlorophenyl)-2-furaldehyde, 82.5 g (1.0 mole) of anhydrous sodium acetate, 70 g (1.0 mole) of hydroxylamine hydrochloride, 1750 ml of 95 percent EtOH and 175 ml of water was heated at reflux for 5 hours. The mixture was cooled to room temperature and then added to 8.1 of ice water. The resulting solid was washed with water and dried at 60° to yield 123 g (96 percent).

C. Preparation of 5-(2,4-Dichlorophenyl)-2-furonitrile

A mixture of 114 g (0.445 mole) of 5-(2,4-dichlorophenyl)-2-furaldehyde oxime and 560 ml of acetic anhydride was refluxed for 3 hours, cooled, and then added to ice. The resulting solid was filtered, washed with water and dried at 60° to yield 105 g (99 percent).

D. Preparation of Ethyl 5-(2,4-Dichlorophenyl)-2-furimidate Hydrochloride

A mixture of 114 g (0.48 mole) of 5-(2,4 dichlorophenyl)-2-furonitrile, and 2000 ml of absolute ethanol was saturated with HCl gas with a solution forming. Using the water pump, ca. 1500 ml of solvent was removed by distillation, and the resulting mixture was filtered and air dried to yield 80 g (59 percent).

E. Preparation of 5-(2,4-dichlorophenyl)-2-furamidine Hydrochloride

A solution of 50 ml of anhydrous methanol containing 9 g (0.530 mole) of NH$_3$ was treated portionwise with 10 g (0.035 mole) of ethyl 5-(2,4-dichlorophenyl)-2-furimidate hydrochloride. The resulting mixture was refluxed for 2 hours, cooled, filtered and air dried to yield 7.5 g (74 percent). An analytical sample was prepared by dissolving a sample in refluxing CH$_3$OH, treating with Darco, cooling and diluting with ether. This procedure was done two times and the resulting white solid dried in the vacuum pistol at the temperature of refluxing CHCl$_3$, m.p. > 300°.

Anal. Calcd. for C$_{11}$H$_8$Cl$_2$N$_2$O.HCl: C, 45.31; H, 3.11; N, 9.61. Found: C, 45.22; H, 3.22; N, 9.52.

EXAMPLE XXIV 5-(o-Chlorophenyl)-2-furamidine Hydrochloride

A. Preparation of 5-(o-Chlorophenyl)-2-furaldehyde

A mixture of 255 g (2.0 moles) of o-chloroaniline, 690 ml of concentrated hydrochloric acid and 260 ml of water was heated at 80° for 20 minutes and then cooled to 0°. A solution of 138 g (2.0 moles) of sodium nitrite in 500 ml of water was added while maintaining the temperature of 0°–5° by means of an ice bath. The reaction was kept at 0° for 2 hours. A solution of 192 g (2.0 moles) of furfural in 200 ml of acetonitrile was added followed by a solution of 40 g of $CuCl_2 \cdot 2H_2O$ in 100 ml of water. The reaction was stirred at 0° for one hour and then at ambient thempercature overnight. The oily mixture was extracted with 3 × 750 ml of ether and the combined etheral extracts were washed with 1000 ml of 6 percent sodium carbonate solution, washed with 1000 ml of water over magnesium sulfate. The ether was removed on the Calab evaporator and the residual solid washed with hexane and air dried to yield 89 g (22 percent).

B. Preparation of 5-(o-Chlorophenyl)-2-furaldehyde oxime

A mixture of 89 g (0.43 mole) of 5-(o-chlorophenyl)-2-furaldehyde, 1000 ml of ethanol, 60 g (0.86 mole) of hydroxylamine hydrochloride, and 200 ml of water was heated at 60° for 15 minutes. The solvent was removed on the Calab evaporator and the residual solid washed with water and air dried to yield 96 g (100 percent).

C. Preparation of 5-(o-Chlorophenyl)-2-furonitrile

A mixture of 96 g (0.43 mole) of 5-(o-chlorophenyl)-2-furaldehyde oxime, and 1150 ml of acetic anhydride was refluxed for 4 hours and the resulting solution added to 6 l. of ice and allowed to stand 48 hours. The resulting solid was filtered, washed twice with water and dried in a desiccator over $P_2O_5$ to yield 84 g (100 percent).

D. Preparation of Ethyl 5-(o-chlorophenyl)-2-furimidate Hydrochloride

A stirring solution of 82 g (0.45 mole) of 5-(o-chlorophenyl)-2-furonitrile, and 2200 ml of absolute ethanol was treated with hydrogen chloride gas to the saturation point. The alcohol was removed on the Calab evaporator and the residual solid washed twice with hexane to yield 28 g (22 percent).

E. Preparation of 5-(o-chlorophenyl)-2-furamidine Hydrochloride

To 50 ml of anhydrous methanol and that had been saturated with ammonia gas, was added portionwise 10 g (0.035 mole) of ethyl 5-(o-chlorophenyl)-2-furimidate hydrochloride. The resulting mixture was heated at reflux for 2 hours and then stirred at room temperature for 48 hours. The solid was filtered and air dried to yield 6 g (67 percent). An analytical sample was obtained by dissolving a sample in refluxing $CH_3OH$, treating with Darco, cooling, and diluting with ether. This procedure was done twice and the resulting white solid dried in the vacuum piston at the temperature of boiling water, m.p. ca. 290°.

Anal. Calcd. for $C_{11}H_9ClN_2O \cdot HCl$: C, 51.38; H, 3.92; N, 10.90. Found: C, 51.36; H, 3.95; N, 10.80.

EXAMPLE XXV 5-(p-methoxyphenyl)-2-furamidine Hydrochloride

A mixture of p-anisidine (186 g, 1.5 mole) in $H_2O$ (150 ml) and concentrated HCl (400 ml) was diazotized by dropwise addition of $NaNO_2$ (108 g, 1.56 mole) in $H_2O$ (300 ml), with the pot temperature kept below 10°. Thirty minutes after completing the addition, furfural (184 g, 1.89 mole) in $H_2O$ (600 ml) was added, followed by $CuCl_2$ (45 g) in $H_2O$ (300 ml). The mixture was heated at 50°–60° for four hours and stirred overnight at room temperature. The product was extracted with ether (1800 ml), dried over $MgSO_4$ and Darco, and filtered; the filtrate was stripped of solvent under reduced pressure. The residue was distilled in vacuo, collecting the product at 175°–185° (0.6 – 1.0 mm), yield: 75 g (24 percent).

A solution of hydroxylamine hydrochloride (25.5 g, 0.37 mole) in $H_2O$ (50 ml) was added to a solution of 5-(p-methoxyphenyl)-2-furaldehyde (75 g, 0.37 mole) in ethanol (250 ml) and stirred for 45 minutes. The mixture was cooled overnight and the product collected by filtration, yield: 66 g (88%).

A stirred mixture of 5-(p-methoxyphenyl)-2-furaldehyde oxime (21 g, 0.096 mole) and benzene (400 ml) was heated to reflux and a solution of $POCl_3$ (4 ml) in benzene (10 ml) was added dropwise over 10 minutes. The mixture was refluxed for 1½ hours and filtered while hot. The filtrate was washed with 5percent $NaHCO_3$ (400 ml), $H_2O$ (400 ml), dried over $MgSO_4$ and Darco, and filtered; the filtrate stripped of solvent under reduced pressure, yield: 17 g (90 percent).

A mixture of 5-(p-methoxyphenyl)-2-furonitrile (22 g, 0.11 mole), absolute methanol (500 ml) and $NaOCH_3$ (5.5 g, 0.11 mole) was stirred 15 hours at room temperature, poured onto ice, stirred for 45 minutes and the product was collected by filtration, yield: 19 g (75 percent).

A mixture of 5-(p-methoxyphenyl)-2-furimidate (19 g, 0.082 mole), $NH_4Cl$ (4.4 g, 0.082 mole) and methanol (200 ml) was stirred overnight at room temperature and refluxed for thirty minutes and cooled. The amidine hydrochloride was collected by filtration, yield: 13.5 g (66 percent). A sample was recrystallized from methanol, m.p. 290°–293°.

Anal. Calcd. for $C_{12}H_{12}N_2O_2 \cdot HCl$: C, 57.03; H, 5.19; N, 11.09. Found: C, 56.84; H, 5.10; N, 10.97.

EXAMPLE XXVI 5-(p-Acetylphenyl)-2-furamidine Hydrochloride

A. Methyl 5-(p-Acetylphenyl)-2-furimidate 5-(p-Acetylphenyl)-2-furonitrile (14.3 g, 0.068 m.) was dissolved in 1800 ml of anhydrous methanol with stirring. Then 3.66 g (0.068 m) of sodium methoxide powder was added and a red solution was allowed to stir overnight at ambient temperature. The solution was filtered and the filtrate was concentrated at reduced pressure to about ¼ of its original volume and then poured into ice water. Yellow solid separated very readily and was collected, washed with water and dried at 100°. The yield of the imidate was 15.5 g (94 percent).

B. 5-(p-Acetylphenyl)-2-furamidine Hydrochloride

The above imidate (15.5 g, 0.064 m) was heated at reflux with 15 g of anhydrous ammonium acetate in 500 ml of anhydrous methanol for 2½ hr. After cooling, the mixture was filtered and the filtrate was concentrated at reduced pressure to a yellow pasty solid. The solid was triturated with water and most of it went into solution. The mixture was filtered and the filtrate was made alkaline with conc. ammonium hydroxide until no more yellow solid separated. After cooling, the mixture was filtered and the solid was collected, washed well with water and air dried. The yield of crude material was 12.2 g. Recrystallization from 3 l. of ethyl acetate gave 10.5 g of the free amidine. The solid was pulverized and stirred in 100 ml of ethanolic HCl solution for 1 hr. After cooling, the solid was collected, washed with ethanol and dried at 100°. The yield of amidine hydrochloride was 11.0 g (65 percent).

An analytical sample decomposed at 290°.
Anal. Calcd. for $C_{13}H_{12}N_2O_2 \cdot HCl$: C, 58.98; H, 4.95; N, 10.58. Found: C, 58.80, H, 4.88 N 10.28.

EXAMPLE XXVII

5-(p-Aminophenyl)-N,N-diethyl-2-furamidine Hydrochloride

A mixture of ethyl 5-(p-nitrophenyl)-2-furimidate hydrochloride (30 g, 0.1 mole), diethylamine (108 ml) and ethanol (200 ml) was refluxed for 5 hours and stored overnight at room temperature. The mixture was stripped of solvent under reduced pressure, the residue was washed with 5 percent $NaHCO_3$ (500 ml) and $H_2O$ (500 ml), and the product was collected by filtration (air dried). The light-brown material was dissolved in isopropanol, adjusted to pH 3 with ethanol-HCl, and the 5-(p-nitrophenyl)-N,N-diethyl-2-furamidine hydrochloride was collected by filtration, yield: 18 g (56 percent). A sample was recrystallized from isopropanol, m.p. 240°–242°.

Anal. Calcd. for $C_{15}H_{17}N_3O_3 \cdot HCl$: C, 55.64; H, 5.60; N, 12.98. Found: C, 55.62; H, 5.65; N, 12.95.

A mixture of 5-(p-nitrophenyl)-N,N-diethyl-2-furamidine hydrochloride (18 g, 0.056 mole), ethanol (580 ml) and 5 percent Pd/C - 50 percent $H_2O$ (10 g) was subjected to hydrogenation at room temperature for two hours, using 163 psia $H_2$ (theory: 168 psia). The catalyst was removed by filtration, the filtrate was diluted with anhydrous ether (500 ml) and cooled, and the title product was collected by filtration, yield: 10 g (61 percent). A sample was recrystallized from acetonitrile m.p. 279°–282°.

Anal. Calcd. for $C_{15}H_{19}N_4O \cdot HCl$: C, 61.32; H, 6.86; N, 14.30. Found: C, 61.40; H, 6.98; N, 14.27.

EXAMPLE XXVIII

N,N-Diethyl-5-(m-trifluoromethylphenyl)-2-furamidine Hydrochloride

A solution of 7.0 g (0.22 mole) of ethyl 5-(3-trifluoromethylphenyl)-2-furimidate hydrochloride and 17.7 g (0.242 mole) of anhydrous diethylamine in 10 ml absolute ethanol was refluxed for four hours and stored in a refrigerator overnight. Some diethylamine hydrochloride was filtered off and the filtrate concentrated to a dark oil which yielded 4 g (50 percent) of light brown solid when stirred in ether, m.p. 154°–160°.

Anal. Calcd. for $C_{16}H_{17}F_3N_2O \cdot HCl$: C, 55.41; H, 5.23; N, 8.08. Found: C, 55.43; H, 5.15; N, 8.08.

EXAMPLE XXIX

5-(p-Chlorophenyl)-N,N-diethyl-2-furamidine Hydrochloride

A solution of 15 percent n-butyllithium (125 ml, 0.13 mole) in hexane was added to an ice cold solution of diethylamine (9.5 g, 0.13 mole) in anhydrous ether (150 ml) under a nitrogen atmosphere. After stirring for ten minutes, a solution of 5-(p-chlorophenyl)-2-furonitrile (20.3 g, 0.10 mole) in anhydrous ether (400 ml) was added slowly, keeping the temperature below 5°. The ice bath was removed, the mixture stirred for 1½ hours and $H_2O$ (500 ml) was added slowly, keeping the temperature below 10°. The mixture was stirred for ½ hour and the organic layer was separated. The aqueous phase was extracted with ether (400 ml), and the extract was combined with the organic layer. The solution was dried over $MgSO_4$ and Darco and filtered, and the filtrate was stripped of solvent under reduced pressure. The residue was dissolved in hot cyclohexane, stirred for 10 minutes over Darco and filtered and the filtrate was stripped of solvent under reduced pressure. The residue was dissolved in anhydrous ether and adjusted to pH 2 with ether-HCl. The product was collected by filtration and recrystallized from isopropanol; m.p. 235°–238°; yield: 11 g (35%).

Anal. Calcd. for $C_{15}H_{17}ClN_2O \cdot HCl$: C, 57.51; H, 5.79; N, 8.94. Found: C, 57.57; H, 5.84; N, 9.04.

EXAMPLE XXX

N,N-Diethyl-5-(p-methoxyphenyl)-2-furamidine Fumarate

A solution of 15% n-butyllithium (83 ml, 0.086 mole) in hexane was added to an ice-cold solution of diethylamine (6.3 g, 0.086 mole) in anhydrous ether (100 ml) under a nitrogen atmosphere. After stirring for ten minutes, a solution of 5-(p-methoxyphenyl)-2-furonitrile (17 g, 0.086 mole) in anhydrous ether (400 ml) was added slowly at 0°–5°. The ice bath was removed, the mixture stirred for 1½ hours, $H_2O$ (450 ml) was added slowly keeping the temperature below 10° and the mixture was stirred for ½ hour. The organic layer was separated, the aqueous phase was extracted with ether, and the extract was combined with the organic layer. The solution was dried over $MgSO_4$ and Darco and filtered, and the filtrate was stripped of solvent under reduced pressure. The residue was dissolved in hot cyclohexane, stirred for 10 minutes over Darco and filtered, and the filtrate was stripped of solvent under reduced pressure. A solution of the residue (15 g, 0.055 mole) in ethanol (60 ml) was added to a solution of fumaric acid (6.4 g, 0.055 mole) in ethanol (150 ml), stirred for 45 minutes and cooled over the weekend. The product was collected by filtration, yield: 10 g (30%). A sample was recrystallized from isopropanol, m.p. 184°–186°.

Anal. Calcd. for $C_{16}H_{20}N_2O_2 \cdot C_4H_4O_4$: C, 61.84; H, 6.23; N, 7.21. Found: C, 61.67; H, 6.30; N, 7.04.

EXAMPLE XXXI

N,N-Diethyl-5-phenyl-2-furamidine Fumarate

A solution of 15% n-butyllithium (250 ml, 0.26 mole) in hexane was added to an ice-cold solution of diethylamine (19 g, 0.26 mole) in anhydrous ether (300 ml) under a nitrogen atmosphere. After stirring for 10 minutes, a solution of 5-phenyl-2-furonitrile (34 g, 0.20 mole) in anhydrous ether (800 ml) was added slowly at 0°–5°. The ice bath was removed, the mixture was stirred for 1½ hours and $H_2O$ (1200 ml) was added slowly at <10°. The mixture was stirred for ½ hour, the organic layer was separated, dried over $MgSO_4$ and Darco and filtered, and the filtrate was stripped of solvent under reduced pressure. The residue was dissolved in hot petroleum ether, stirred for 10 minutes over Darco, filtered, and the filtrate was stripped of solvent under reduced pressure. The residue (41 g, 0.17 mole) was dissolved in ethanol (200 ml) and added to a solution of fumaric acid (19.7 g, 0.17 mole) in ethanol (400 ml). The mixture was stirred for ½ hour, cooled overnight, and the product was collected by filtration. The product was recrystallized from ethanol; m.p. 187°–190°, yield: 19 g (27%).

Anal. Calcd. for $C_{15}H_{18}N_2O \cdot C_4H_4O_4$: C, 63.67; H, 6.19; N, 7.82. From: C, 63.32; H, 6.29; N, 7.66.

While the herebefore described preparation of the amidines of this invention results in the obtainment of them in the form of the hydrochloride or fumarate salt, other pharmaceutically acceptable salts are readily prepared by treating the amidine or its hydrochloride with acids such as maleic, pamoic, tartaric and sulfuric.

What is claimed is:

1. A compound of the formula:

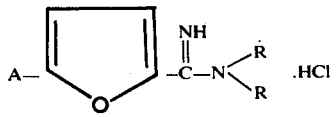

wherein A is or

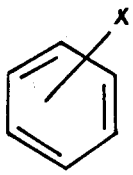

with X representing hydrogen, nitro, amino, halo, dihalo, 4-(lower)alkyl, 3-trifluoromethyl, 3,4-dimethoxy, 4-methyl-3-chloro, 4-alkoxy, 4-dimethylamino, 4-ethoxycarbonyl, 4-hydroxy, 4-methylthio, 4-(1-hydroxy)ethyl, or 4-acetyl, and R represents hydrogen or ethyl.

2. The compound 5-(p-nitrophenyl)-2-furamidine hydrochloride.

3. The compound 5-(p-aminophenyl)-2-furamidine hydrochloride.

4. The compound 5-(p-chlorophenyl)-2-furamidine hydrochloride.

5. The compound 5-(3-trifluoromethylphenyl)-2-furamidine hydrochloride.

6. The compound 5-phenyl-2-furamidine hydrochloride.

7. The compound 5-(3-chloro-4-methylphenyl)-2-furamidine hydrochloride.

8. The compound 5-(o-nitrophenyl)-2-furamidine hydrochloride.

9. The compound 5-(p-hexyloxyphenyl)-2-furamidine hydrochloride.

10. The compound 5-(3,4-dichlorophenyl)-2-furamidine hydrochloride.

11. The compound 5-(p-dimethylaminophenyl)-2-furamidine hydrochloride.

12. The compound ethyl p-benzoate hydrochloride.

13. The compound 5-(p-methylphenyl)-2-furamidine hydrochloride.

14. The compound 5(p-fluorophenyl)-2-furamidine hydrochloride.

15. The compound 5-(o-aminophenyl)-2-furamidine hydrochloride.

16. The compound 5-(p-hydroxyphenyl)-2-furamidine hydrochloride.

17. The compound 5-(p-isopropylphenyl)-2-furamidine hydrochloride.

18. The compound 5-(p-methylthiophenyl)-2-furamidine hydrochloride.

19. The compound 5-2-furamidine hydrochloride.

20. The compound 5-(m-bromophenyl)-2-furamidine hydrochloride.

21. The compound 5-(m-aminophenyl)-2-furamidine hydrochloride.

22. The compound 5-(m-nitrophenyl)-2-furamidine hydrochloride.

23. The compound 5-(2,4-dichlorophenyl)-2-furamidine hydrochloride.

24. The compound 5-(o-chlorophenyl)-2-furamidine hydrochloride.

25. The compound 5-(p-methoxyphenyl)-2-furamidine hydrochloride.

26. The compound 5-(p-acetylphenyl)-2-furamidine hydrochloride.

27. The compound 5-(p-aminophenyl)-N,N-diethyl-2-furamidine hydrochloride.

28. The compound 5-(3-trifluoromethylphenyl)-N,N-diethyl-2-furamidine hydrochloride.

* * * * *

UNITED STATES PATENT OFFICE
CERTIFICATE OF CORRECTION

Patent No. 3,906,010  Dated September 16, 1975

Inventor(s) Stanford S. Pelosi, Jr., et al.   Page 1 of 2

It is certified that error appears in the above-identified patent and that said Letters Patent are hereby corrected as shown below:

On the facing page in the naming of the inventors "You" should be --Yu--

In the schema bridging columns 1 and 2:

a. Under the first horizontal arrow "NaOAC" should be --NaOAc--
b. Above the arrow running diagonally to the left "LiN$\langle^R_R$" should be --LiN$\langle^R_R$--
c. Above the last arrow running toward the left "C$_2$H$_5$NH" should be --(C$_2$H$_5$)$_2$NH--

In column 3, line 2: Insert a parenthesis before "p".

In column 4, line 63: "(3-Chloro-4-methyl)" should be --(3-Chloro-4-methylphenyl)--

In column 5, line 24: "(3-chloro-4-methyl)" should be --(3-chloro-4-methylphenyl)--; the same change should also be made at lines 33, 34, 35, 42, 44 and 46.

In column 5, line 62: "F-829" should be --product--

In column 6, line 30: "nitrite" should be --nitrile--

In column 8, line 37: "yeild" should be --yield--

In column 9, line 19: After "2-" insert --furyl--

In column 9, line 36: "(p-ethocycarbonyl-" should be --(p-ethoxycarbonyl- --

In column 9, line 44: "(p-3thoxycarbonylphenyl)" should be --(p-ethoxycarbonylphenyl)--

In column 10, line 17: "Dacro" should be --Darco--

In column 10, line 33: Strike "The", first occurrence.

In column 12, line 5: "(p-Benzyloxphenyl)" should be --(p-Benzyloxyphenyl)--

UNITED STATES PATENT OFFICE
CERTIFICATE OF CORRECTION

Patent No. 3,906,010  -  Dated September 16, 1975

Inventor(s) Stanford S. Pelosi, Jr., et al.  Page 2 of 2

It is certified that error appears in the above-identified patent and that said Letters Patent are hereby corrected as shown below:

In column 12, line 18: "wiith" should be --with--

In column 12, line 20: "givie" should be --give--

In column 12, line 39: "hydrochloridie" should be --hydrochloride--

In column 13, lines 50-52: strike "and concentrated HCl (450 ml) was diazotized by dropwise addition of a solution of $NaNO_2$(70g) in $H_2O$ (280 ml),"

In column 15, line 37: "(p-1-Hhydroxyethylphenyl)" should be --(p-1-Hydroxyethylphenyl)--

In column 15, line 42: "dimethylforamide" should be --dimethylformamide--

In column 18: "Example XXII" should be --Example XXIII--

In Claim 1, line 18: "or" should be stricken.

In Claim 12: "ethyl p-benzoate hydrochloride" should be --ethyl p-[(5-amidino)-2-furyl] benzoate hydrochloride--

In Claim 19: "5-2-furamidine hydrochloride" should be --5-[p-(1-hydroxyethyl)phenyl]-2-furamidine--

Signed and Sealed this

Tenth Day of August 1976

[SEAL]

Attest:

RUTH C. MASON
Attesting Officer

C. MARSHALL DANN
Commissioner of Patents and Trademarks